US005773546A

United States Patent [19]
Tomlin et al.

[11] Patent Number: 5,773,546
[45] Date of Patent: *Jun. 30, 1998

[54] PROCESS FOR POLYMERIZATION OF WATER-SOLUABLE AND WATER-INSOLUABLE CARBOXYLIC ACID POLYMERS AND COPOLYMERS IN A SILICONE OIL SOLVENT

[75] Inventors: Anthony S. Tomlin, Island Lake; Milan F. Sojka, Algonquin, both of Ill.

[73] Assignee: AMCOL International Corporation, Arlington Heights, Ill.

[*] Notice: The term of this patent shall not extend beyond the expiration date of Pat. No. 5,618,877.

[21] Appl. No.: 723,866

[22] Filed: Sep. 30, 1996

Related U.S. Application Data

[63] Continuation of Ser. No. 486,455, Jun. 7, 1995, Pat. No. 5,618,877, which is a continuation-in-part of Ser. No. 327,580, Oct. 24, 1994, abandoned.

[51] Int. Cl.$^6$ .................................................. C08F 20/20
[52] U.S. Cl. ...................... 526/318.43; 526/194; 524/558
[58] Field of Search ............................................. 524/558

[56] References Cited

U.S. PATENT DOCUMENTS

| | | | |
|---|---|---|---|
| 3,915,921 | 10/1975 | Schlatzer | 260/17.4 |
| 4,509,949 | 4/1985 | Huang | 586/558 |
| 4,675,426 | 6/1987 | Crivello | 526/194 |
| 4,709,767 | 12/1987 | Alexander | 175/65 |
| 4,794,140 | 12/1988 | Alexander | 524/827 |
| 5,189,102 | 2/1993 | Tsubuko et al. | 525/254 |
| 5,288,814 | 2/1994 | Long, II et al. | 525/450 |
| 5,336,740 | 8/1994 | Eian | 526/194 |

FOREIGN PATENT DOCUMENTS

| | | |
|---|---|---|
| 0 206 072 A2 | 12/1986 | European Pat. Off. . |
| 0 301 532 A2 | 1/1989 | European Pat. Off. . |
| 0 371 421 A2 | 6/1990 | European Pat. Off. . |

OTHER PUBLICATIONS

Lochhead et al., Encyclopedia of Polymers and Thickeners in Cosmetics, *Cosmetics and Toiletries*, vol. 108, May 1993 at pp. 95–138.

Yoshikazu et al., "New Emulsion System—Polymeric 'Water in Water' Emulsions," *Contemp. Topics in Polymer Sci.*, 14 575–586 (1984).

Davidson et al., "Microrheology of Thickened Suspensions," *J. Colloid and Interface Science*, vol. 55, 163–169 (1975).

BF Goodrich Product Description "Carbopol® Water Soluable Resins," pp. 1–35.

DuPont Product Brochure, "VAZO® Polymerization Initiators, Uses, Storage and Handling," pp. 1–16 (Jul. 1984).

Dow Corning Product Brochure, "Information About Dow Corning Silicone Fluids", 200® Fluid, 0.65cs and 200® Fluid, 1.0cs, (1993).

Dow Corning Product Brochure, "Information About Dow Corning Silicon Fluids", 200® Fluid, 1.5cs; 200® Fluid, 2.0cs; and 200® Fluid, 5.0cs (1993).

Hüls America Inc. Product Borchure on Silicones, at pp. 16, 270, 271, 274, 275, and 298.

Dow Corning Product Brochure, "Information About Volatile Silicone Fluids," Dow Corning® 224, 245, 344, and 345 Fluids, 200® Fluid (0.65cs) from Dow Corning Corporation (1993).

*Primary Examiner*—Joseph L. Schofer
*Assistant Examiner*—N. Sarafim
*Attorney, Agent, or Firm*—Marshall, O'Toole, Gerstein, Murray & Borun

[57] ABSTRACT

The present invention is directed to an improved process for producing water-soluble and water-insoluble carboxylic acid polymers and copolymers. The process comprises the steps of polymerizing a carboxylic acid monomer, and a polyfunctional cross-linker monomer in a second embodiment, in an effective molar ratio, in a silicone solvent under an inert atmosphere in the presence of an effective amount of an initiator. The preferred copolymer of the second embodiment includes acrylic acid as the carboxylic acid monomer and a lauryl methacrylate and/or stearyl methacrylate as a comonomer. The resulting copolymers have new and unexpected tolerance to salt-containing water when mixed therewith.

8 Claims, No Drawings

PROCESS FOR POLYMERIZATION OF WATER-SOLUABLE AND WATER-INSOLUABLE CARBOXYLIC ACID POLYMERS AND COPOLYMERS IN A SILICONE OIL SOLVENT

CROSS-REFERENCE TO RELATED APPLICATION

This application is a continuation of U.S. application Ser. No. 08/486,455, filed Jun. 7, 1995, now U.S. Pat. No. 5,618,877 which is a continuation-in-part of application Ser. No. 08/327,580 filed Oct. 24, 1994, now abandoned.

FIELD OF THE INVENTION

The present invention is directed to an improved process for producing carboxylic acid polymers and copolymers in a silicone oil solvent. Non-cross-linked or slightly cross-linked polymers and copolymers produced by the process of the present invention are water-soluble and find use in lowering the viscosity of aqueous suspensions, as used for drilling fluid additives, additives for the detergent industry, and the like; and as dispersants. The cross-linked, water-insoluble polymers and copolymers produced by the process of the present invention provide a viscosity that is equal to or greater than 50,000 centipoises ("cps") when measured in water at a 0.5% by weight concentration, suited for use in foods, cosmetics, printing inks, pastes, and coating applications. The cross-linked, water-insoluble copolymers produced from acrylic acid and the fatty esters ($C_8$–$C_{30}$) of $\alpha$, $\beta$ unsaturated acids, such as acrylic acid and/or maleic acid, e.g., lauryl methacrylate and stearyl methacrylate, are particularly resistant to salt-containing water, for viscosifying and absorption of saline-containing water, urine, and the like.

BACKGROUND OF THE INVENTION

Others have produced non-cross-linked polyacrylates for use as drilling fluid additives, as disclosed in U.S. Pat. Nos. 4,709,767 and 4,794,140, from an aqueous solution of partially neutralized acrylic acid.

Also, numerous processes are known in the art for producing cross-linked, water insoluble, viscosifying acrylic polymers. For example, EPO Publication No. 0 371 421 A2 discloses a process for producing a cross-linked polyacrylic acid polymer in a solvent selected from acetone, alkyl acetates, and mixtures thereof. One problem with the '421 process is that it uses the organic solvent ethyl acetate, or acetone, either of which is flammable, hazardous, and requires special handling provisions. A second problem with the process of the '421 disclosure is that the best polymer that was capable of being produced by the disclosed process only had a viscosity of 59,200 cps for a 1% solution.

U.S. Pat. No. 3,915,921 to Schlatzer, which issued on Oct. 28, 1975, discloses a viscosifying copolymer that is produced by copolymerizing a carboxylic acid monomer and one or more alkyl acrylate esters. The '921 patent, like the previously discussed '421 patent, discloses copolymerization that occurs in an organic solvent such as benzene, xylene, tetralin, heptane, hexane, carbon tetrachloride, methylchloride, ethylchloride, bromotrichloromethane, dimethylcarbonate, diethylcarbonate, ethylenedichloride, and mixtures thereof. Thus, a problem with the '921 process, like that of the '421 process, is that it utilizes hydrocarbon solvents, which are flammable and in many instances hazardous to health, while the halocarbon solvents are generally just hazardous. Polymerization in any one of the disclosed solvents can give rise to hazardous and/or flammable vapor emissions, which require special precautions. A second problem with the Process disclosed in the '921 patent is that the best viscosity that was reported for any polymer at the 0.5% by weight concentration in water was 71,200 cps.

U.S. Pat. No. 4,509,949 to Huang, which issued on Apr. 9, 1985, discloses a process for producing water thickening agents consisting of copolymers of acrylic acids and esters that are cross-linked with a polyfunctional vinylidene monomer containing at least two terminal $CH_2$ groups. One problem with the '949 process, like most of the processes of the prior art, is that the '949 process also teaches polymerization in a generally hazardous solvent such as "benzene, tetralin, hexane, heptane, cyclohexane, carbontetrachloride, chloroform, trichloroethylene, methylchloride, ethylchloride, and methylenechloride; chlorofluoroalkanes, such as chlorofluoromethane and chlorofluoroethane, each containing at least four halogen atoms; esters such as methylacetate and ethylacetate, alcohols including methanol, ethanol, butanol and the like." ['949 at column 4, lines 37–44.] Another problem with the '949 process is that it is only capable of producing polymers that at best provide modest increases in viscosity. For example, the best viscosity that was produced by the products of the '949 process was 12,000 cps for a 1.2% by weight solution of the polymer. ['949 at column 8, line 8.]

In view of the problems commonly associated with the '421, '921 and '949 patents, it is an object of the present invention to produce a water-soluble acrylic polymer or a cross-linked, water-insoluble, acrylic viscosifying polymer in a non-hazardous and a non-flammable solvent that generally does not require special handling. In addition, an object of one embodiment of the present invention is that the cross-linked, water-insoluble polymer produced by the process of the present invention has a viscosity of at least 50,000 cps when measured as a 0.5% by weight solution in water at room temperature.

One method for producing a viscosifying polymer that does not use hydrocarbon or halocarbon solvents is disclosed in EPO Publication No. 0 301 532 A2, which was published on Feb. 1, 1989. The '532 disclosure teaches that copolymerization can be effected in carbon dioxide to yield a fluffy powder when the acrylic acid, the comonomer, and the chemical initiator are dissolved in a single liquid phase, i.e., liquid carbon dioxide. The best viscosity that was obtained with the product produced by the '532 process was 12,550 cps for 0.2% by weight solution in water. One problem with the '532 process is that the carbon dioxide must be pressurized in order to form a liquid at the reaction temperatures. In particular, pressures of 1200 to 2500 pounds per square inch would not be uncommon. Such pressurized reactions require special reaction vessels and equipment. An object of the present invention is to provide a process for producing a viscosifying polymer that is capable of utilizing a conventional, unpressurized reactor.

A second problem with the '532 process is that it produces a product having a low viscosity (12,550 cps for a 0.2% by weight solution). To overcome such low viscosities, an object of one embodiment of the present invention is to provides a process that produces a viscosifying copolymer that exhibits a viscosity of 50,000 cps or greater in a 0.5% by weight aqueous solution.

SUMMARY OF THE INVENTION

The present invention has two embodiments. In a first embodiment of the present invention, a water-soluble acrylic polymer or copolymer is manufactured by polymerizing a carboxylic acid monomer, preferably an acrylic monomer, without using a cross-linking agent, in a silicone solvent, under an inert atmosphere in the presence of an effective amount of a polymerization initiator. In its second embodiment, the present invention is directed to an improved process for manufacturing a water-insoluble, cross-linked viscosifying polymer or copolymer. The process of the second embodiment of the present invention includes the steps of polymerizing a carboxylic acid monomer, preferably an acrylic monomer, and a cross-linker monomer, in a molar ratio of 1:0.03 to 1:0.10, respectively, in a silicone solvent, under an inert atmosphere in the presence of an effective amount of an initiator to form a viscosifying polymer that a 0.5% by weight aqueous mucilage provides a viscosity of about 50,000 to 300,000 cps. A preferred initiator for both embodiments of the process of the present invention is a redox system.

In the second embodiment of the present invention, the process is directed to the manufacture of a viscosifying polymer or copolymer comprising a cross-linked polymer polymerized from one or more carboxylic acid monomers and a polyfunctional cross-linking agent in a molar ratio of about 1:0.03 to 1:0.10, respectively. The viscosifying copolymer of the second embodiment of the present invention is characterized in that a 0.5% by weight aqueous solution of the viscosifying copolymer has a viscosity of about 50,000 to about 300,000 cps, preferably about 100,000 to 300,000 cps, and more preferably, about 200,000 to about 300,000 cps.

DETAILED DESCRIPTION OF THE INVENTION

The present invention has multiple aspects. In a first aspect, the present invention is directed to an improved process for producing a water-soluble carboxylic acid polymer or copolymer in a silicone oil solvent. In accordance with another aspect of the present invention, an improved process is directed to manufacturing a water-insoluble, cross-linked carboxylic acid polymer or copolymer capable of providing new and unexpected increases in viscosity to aqueous solutions or suspensions. The process of manufacturing the cross-linked, water-insoluble polymers and copolymers of the present invention comprises the steps of:

Polymerizing a carboxylic acid monomer and a polyfunctional cross-linker monomer in a molar ratio of about 1:0.03 to 1:0.10, respectively, in a silicone solvent under an inert atmosphere in the presence of an effective amount of initiator to form a viscosifying polymer characterized by being capable of producing a 0.5% by weight aqueous mucilage that has a viscosity of about 50,000 to 300,000 cps. All viscosities referenced herein are measured on a Brookfield Viscometer using ASTM E-2196 at 1 RPM.

Where the carboxylic acid monomer is acrylic acid and the cross-linker monomer is a bifunctional cross-linker such as allyl methacrylate, the effective molar ratio between the acrylic acid and the allyl methacrylate is 1:0.03 to 1:0.10. As the functionality of the cross-linker monomer increases, from bifunctionality to trifunctionality, tetrafunctionality and multifunctionality, the amount of cross-linker monomer that is needed to provide an "effective molar ratio" decreases due to the increasing equivalency of each molecule of cross-linker.

The process of the present invention utilizes a carboxylic acid monomer i.e., a carboxylic acid having at least one unsaturated carbon-carbon double bond. Suitable carboxylic acid monomers include the olefinically-unsaturated carboxylic acids containing at least one carbon-to-carbon olefinic double bond, and at least one carboxyl group which readily functions in polymerization because of its presence in the monomer molecule, either in the alpha-beta position with respect to a carboxyl group, —C=C—COOH; or as part of a terminal methylene grouping, $CH_2$=C<. Olefinically-unsaturated acids of this class include such materials at the acrylic acids; alpha-cyano acrylic acid; beta methylacrylic acid (crotonic acid); alpha-phenyl acrylic acid, beta-acryloxy propionic acid; cinnamic acid; p-chloro cinnamic acid; 1-carboxy-4-phenyl butadiene-1,3, itaconic acids; citraconic acid; mesaconic acid; glutaconic acid; aconitic acid; maleic acid; fumaric acid; and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same carboxylic acid molecule. Maleic anhydride and other acid anhydrides useful herein have the general structure

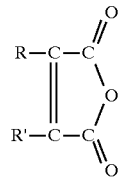

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the monolefinic acrylic acids having the general structure

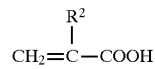

wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Other useful carboxylic monomers are maleic acid and its anhydride.

The polymers manufactured in accordance with the present invention includes both homopolymers of carboxylic acids or anhydrides thereof, or the defined carboxylic acids copolymerized with one or more other monomers containing at least one terminal>$CH_2$ group. Such monomers include, for example, acrylate ester monomers including those acrylic acid ester monomers such as derivatives of an acrylic acid represented by the formula

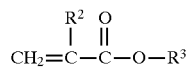

wherein $R^3$ is an alkyl group having from 1 to 30 carbon atoms, preferably 1 to 20 carbon atoms and $R_2$ is hydrogen, methyl or ethyl, present in the copolymer in an amount, for example, from about 1 to 40 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like. Higher alkyl acrylic esters are decyl acrylate, isodecyl methacrylate, lauryl acrylate, stearyl acrylate, behenyl acrylate and melisoyl acrylate. Mixtures of two or three or more long chain acrylic esters may be successfully polymerized with one of the carboxylic monomers. Other comonomers include olefins, including alpha olefins, vinyl ethers, vinyl esters, and mixtures thereof. A preferred carboxylic acid monomer is "acrylic acid." By the term "acrylic acid" as used herein, is meant acrylic acid and its homologs, such as methacrylic acid, ethacrylic acid, itaconic acids, maleic acids and their respective anhydrides.

The second embodiment of the process of the present invention utilizes a polyfunctional cross-linker monomer, i.e., a monomer having at least two unsaturated carbon-carbon double bonds, each of which is capable of polymerizing independently of the other. Typical cross-linker monomers are bifunctional, trifunctional or tetrafunctional monomers. Representative bifunctional monomers include allyl methacrylate, allyl acrylate, dimethyldiallyl ether, divinyl benzene, bisphenol A dimethacrylate, divinyl glycol and ethylene glycol dimethacrylate. Typical trifunctional cross-linkers include triallyl isocyanurate, triallylcyanurate, trimethylolpropane triacrylate, trimethylol propane and trimethacrylate. Typical tetrafunctional cross-linker monomers include tetramethylolmethane tetraacrylate, tetramethylolmethane tetramethacrylate and tetravinyl silane. Typical polyfunctional cross-linker monomers include allyl pentaerythritol, trimethylolpropane diallyl ether and allyl sucrose. Other cross-linking monomers include, for example, diallyl esters, dimethallyl esters; allyl or methallyl acrylates and acrylamides; tetraallyl tin; tetravinyl silane; polyalkenyl methanes; diacrylates, and dimethacrylates; divinyl compounds such as divinyl benzene; polyallyl phosphate; diallyloxy compounds; phosphite esters and the like. Typical agents are allyl pentaerythritol; allyl sucrose; trimethylolpropane triacrylate; 1,6-hexanediol diacrylate; trimethylolpropane diallyl ether; pentaerythritol triacrylate; tetramethylene dimethacrylate; ethylene diacrylate; ethylene dimethacrylate; triethylene glycol dimethacrylate; and the like. Allyl pentaerythritol; trimethylolpropane diallylether; and allyl sucrose provide excellent polymers. when the cross-linking agent is present, the polymeric mixtures usually contain up to about 5% or more by weight of cross-linking monomer, based on the total of carboxylic acid monomer, plus other monomers, if present, and more preferably about 0.01 to 3.0 weight percent.

In the improved process of the present invention, the copolymerization is achieved under an inert atmosphere. Typically, the inert atmosphere is provided by bubbling or flushing nitrogen, carbon dioxide or argon into the reaction mixture. Although other non-reactive gases may be used, the preferred inert gases are nitrogen and/or argon. Polymerization of the carboxyl-containing monomers, optionally with other comonomers, is usually carried out in the presence of a free radical catalyst in a closed vessel in an inert atmosphere or in an open vessel in an inert atmosphere optionally under reflux at atmospheric pressure. The temperature of the polymerization may be varied from about 0° C. to 125° C. or lower or higher. Polymerization at 25° C. to 90° C. using a free radical catalyst is generally effective in providing monomer to polymer conversion of 75% to 100%.

The polymerization of the improved process of both embodiments of the present invention is performed in a silicone solvent. As shown in Example 4, herein, polymerization of water-insoluble, cross-linked polymers and copolymers, performed in accordance with the present invention in a silicone solvent, are capable of producing a viscosifying copolymer that has a significantly greater viscosity than that produced by the identical polymerization reaction that is carried out in a hydrocarbon solvent, such as ethylacetate, or water. Typical silicone solvents for use in the improved process of the present invention are the cyclomethicones, the linear polydimethylsiloxanes, the aromatic phenyl-containing siloxanes, the polymethylalkyl siloxanes and the fluorosilicones, which are commercially available from a variety of sources, including Dow Corning, Midland, Mich., General Electric Company, Walker and Goldschmidt, Hüls, or Petrarch.

By way of example, the cyclomethicone solvents which are within the scope of the process of the present invention include hexamethylcyclotrisiloxane, octamethylcyclotetrasiloxane, decamethylcyclopentasiloxane, dodecamethylcyclohexasiloxane and mixtures thereof.

By way of further example, the linear polydimethyl siloxane solvents, which are useful in the process of the present invention, are of the formula: $(CH_3)SiO[SiO(CH_3)_2]_xSi(CH_3)_3$ wherein $x=0.65–2,500,000$, and includes hexamethyl disiloxane (i.e., $x=0$), octamethyl trisiloxane (i.e., $x=1$), decamethyl tetrasiloxane (i.e., $x=2$), dodecamethyl pentasiloxane (i.e., $x=3$), etc. and mixtures thereof. The linear polydimethyl siloxane solvents that are used in the process of the present invention are typically non-volatile with boiling points over 192° C., and are represented by the above formula wherein $x=1.5–2,500,000$. More typically, the linear polydimethyl siloxane solvents that are used in the process of the present invention are of the above formula wherein $x=1.5–100$; most typically, $x=1.5–10$.

The aromatic phenyl-containing siloxanes include the diphenyl dimethyl siloxane copolymers and the phenylmethyl siloxane polymers which are of the Formulas I and II below, respectively:

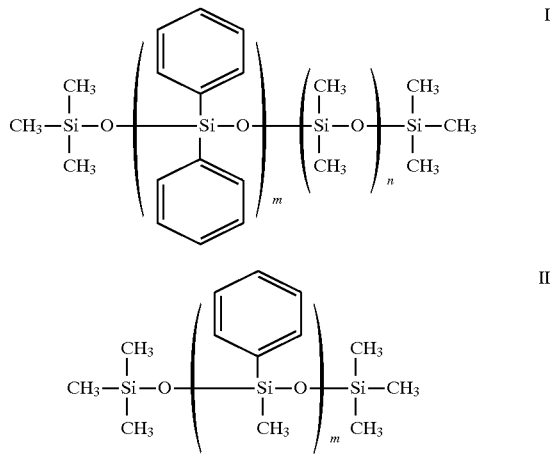

wherein "m" and "n" may be the same or different and are each an integer from 1–100. Most typically, "m" and "n" are separately an integer from 1–10. Other aromatic phenyl-containing siloxanes include 1,1,5,5-tetraphenyl-1,3,3,5-tetramethyltrisiloxane, and 1,1,3,5,5-pentaphenyl-1,3,5-trimethyl trisiloxane.

The polymethylalkyl siloxane solvents are of the formula:

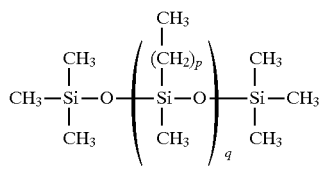

wherein p and q are integers from 1–100 and 1–30, respectively.

Typical fluorosilicones are the polyfluoroalkyl methyl siloxanes, which are of the formula:

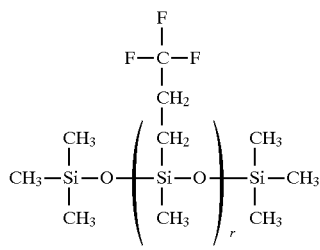

wherein r is an integer from 1–100.

It is also within the scope of the improved process of the present invention that the silicone solvent includes mixtures of one or more of the silicone solvents disclosed herein.

Both embodiments of the process of the present invention also utilizes an effective amount of an initiator. By "effective amount of an initiator" is meant the amount of initiator that is effective to manufacture a polymer or copolymer that, in the water-soluble embodiment, provides a water-soluble polymer or copolymer having a weight average molecular weight in the range of about 1,000 to about 5,000,000, typically about 3,000 to about 1,000,000, and is water-soluble. Such water-soluble polymers may be slightly cross-linked so long as the polymer remains water-soluble (herein defined as capable of solubilizing at least 5 grams out of 100 grams when stirred in 1 liter of water at 25° C). An "effective amount of initiator" for the second embodiment of the present invention, in the manufacture of the cross-linked, water-insoluble carboxylic acid polymers and copolymers, is meant the amount of initiator that is effective to manufacture a water-insoluble polymer or copolymer that in a 0.5% by weight aqueous mucilage, is capable of providing a viscosity of at least 50,000 cps as measured using ASTM E-2196 at 1 RPM. To determine an effective amount of initiator, one of ordinary skill in the art would begin with a small amount of initiator and then increase the amount of initiator until the desired degree of polymerization, and cross-linking for the second embodiment, is obtained. Typically, an effective amount of initiator is from about 0.01 mole percent to 5 mole percent, wherein by the term "mole percent" is meant the percentage of the initiator, relative to all polymerizable reactants, as measured in moles.

Initiators that are suitable for use in both embodiments of the present invention are, for example, the peroxide, azo, amino or nitrile type. Suitable initiators of the peroxide type include the organic peroxides, such as t-butyl hydroperoxide, cumene hydroperoxide and dibenzoyl peroxide. The organic peroxides are commercially available from sources such as Aztec Peroxides Inc., Elyria, Ohio. Suitable inorganic peroxide initiators include hydrogen peroxide, the water-soluble per-acids, and their salts. The water-soluble per-acid salts include the alkali-metal or ammonium persulfates, perphosphates, perborates, perchlorates, percarbonates, and the like, such as sodium or potassium perphosphate, potassium percarbonate, sodium perchlorate, sodium perborate, ammonium perborate and the like.

The organic peroxycarbonates and dicarbonates also are useful as initiators in accordance with both embodiments of the present invention. Suitable peroxycarbonates and -dicarbonates include the following: t-butylperoxy 2-ethylhexyl carbonate; di(4-t-butylcyclohexyl) peroxydicarbonate, dimyristyl peroxydicarbonate; and dicetyl peroxydicarbonate, all of which are commercially available in an aqueous suspension, for example, from Aztec Peroxides, Inc., Elyria, Ohio.

Other polymerization initiators that are capable of being used in both embodiments of the present invention are the easily decomposable organic "azo" compounds, such as 2,2'-azobis(2-methylpropanamidine)dihydrochloride; 2,2'-azobisisobutyronitrile; 2,2'-azobis(2,4-dimethylpentanenitrile); 2,2'-azobis(2-methylbutanenitrile); 1,1'-azobis(cyclohexanecarbonitrile); and 2,2'-azobis (isobutyronitrile). Many of the azo compounds are available from DuPont, Wilmington, Del. under the VAZO® tradename.

A particularly preferred polymerization initiator for use in both embodiments of the process of the present invention is a redox couple/multiple system. A "redox couple/multiple system" is a combination of one or more oxidizing agents and one or more reducing agents that generate transient free radicals during the course of the redox reaction. In many instances, the oxidizing agent is an inorganic or organic peroxide. The reducing agent is any one or more of a variety of reducing agents, alone or in combination with one or more activators. For example, when the oxidizing agent is hydrogen peroxide and the reducing agent is $Fe^{+2}$ (a redox couple system) suitable activators include ammonia, aliphatic amines, $Na_2S_2O_3$, thiourea, ascorbic acid, glyoxal, sodium nitrite or hydroxylamine.

When the oxidizing agent is an organic peroxide, suitable reducing agents include sulfonic acids, α-ketals, formic acid, thiols, and tertiary amines alone or in combination with a soluble metal ion enhancing agent (i.e., salts of Pb, Fe, Co, Ni, Mn, Cu, Zn, or Ce) and/or an activator, such as $NaHSO_3$ mercaptans, diphenylthiourea, ascorbic acid, and the azobisnitriles.

A preferred redox couple/multiple system is a mixture of a peroxide and an azo compound. Preferably, the peroxide and the azo compound are present in the mixture in a 1:1 molar ratio. A particularly preferred redox couple/multiple system for use in the present invention is the combination of dibenzoyl peroxide and 2,2'-azobis(2,4-dimethylpentanenitrile) at about a 1:1 molar ratio. Regardless of the initiator selected, the process of the present invention requires an effective amount of an initiator to form the polymers and copolymers of both embodiments of the present invention.

It has been found, unexpectedly, that when allyl methacrylate is the polyvalent cross-linker monomer in the process of the second embodiment of the present invention, to manufacture a water-insoluble polymer or copolymer, a viscosifying polymer is produced that is characterized by its ability to produce high viscosities even in a 0.5% by weight aqueous mucilage. As reflected in Example 5, when a molar equivalent of allyl methacrylate cross-linker is used in the second embodiment of the process of the present invention, a 0.5% aqueous mucilage of the resulting copolymer has a viscosity of about 143,000 cps whereas, when allyl acrylate is substituted for allyl methacrylate in the second embodiment of the process of the present invention, a 0.5% aqueous mucilage of the resulting copolymer in an aqueous solution is only capable of producing a viscosity of about 27,500 cps.

In the second embodiment of the process of the present invention the molar ratio of acrylic acid to allyl methacrylate is about 1:0.03 to 1:0.1, respectively. Preferably, the molar ratio of acrylic acid to allyl methacrylate is 1:0.03 to 1:0.09, respectively. This is reflected in Table II of Example 5, wherein when lauroyl peroxide was the initiator, a molar ratio of acrylic acid to allyl methacrylate in the range of 1:0.03 to 1:0.09 produced a viscosifying copolymer that was characterized by a viscosity of at least 72,000 cps, i.e., within the range of 72,000 cps to 143,000 cps.

A more preferred molar ratio of acrylic acid to allyl methacrylate is 1:0.06 to 1:0.08, respectively.

The process of the second embodiment of the present invention is capable of producing viscosifying polymer that is characterized by its ability to produce highly viscous solutions even when present in low concentrations. In particular, the second embodiment of the process of the present invention produces a water-insoluble, viscosifying polymer or copolymer that at 0.5% by weight in water provides a mucilage having a viscosity of about 50,000 to about 300,000 cps; preferably, about 100,000 to about 300,000 cps; more preferably, about 200,000 to about 300,000 cps.

In the water-insoluble, viscosifying copolymer of the second embodiment of the present invention, the preferred molar ratio of the preferred reactants, acrylic acid to allyl methacrylate, is about 1:0.06 to 1:0.08.

EXAMPLE 1

Into a 2000 ml three neck flask equipped with a stirrer, thermometer, and condenser was added 324.00 grams of Dow Corning® 244, i.e., octamethylcyclotetrasiloxane, and the siloxane was purged with argon. In a beaker, and during an argon gas purge of the silicone solvent, 36.00 grams of acrylic acid were pre-neutralized with 0.518 grams of anhydrous potassium carbonate by mixing potassium carbonate in acrylic acid until the potassium carbonate dissolved which took about one-quarter of an hour. To the beaker was added 0.44 grams allyl methacrylate cross-linker, and 0.144 grams lauroyl peroxide and the mixture was stirred for five minutes. The contents of the beaker were then poured into the reactor containing the Dow Corning® 244 and stirred at 100 rpm until it became clear, which took about one-half of an hour. With the inert purge continuing at the top of the reactor, heating was commenced at room temperature, T 22° C. When the reaction mixture was about 44° C. the first spot of a polymer was detected visually, and heating was continued to 70° C., whereupon the external heating was discontinued and the exothermic reaction was allowed to proceed on its own. At 78° C., the entire contents of the reaction flask became slightly hazy. At 85° C., the contents were white in color. The exothermic reaction attained a maximum temperature of 122° C. After cessation of the exotherm, the system was allowed to cool to 90° C. at which time mild heating was employed, and a temperature of 90° C. was maintained for five hours. The polymer was recovered from the reaction flask and filtered to remove remaining silicone solvent. The polymer was then dried in an oven for twelve hours at 60° C. The dry polymer was particulate and free-flowing with an average aggregate particle size of 20 microns and the viscosity of a 0.5% by weight mucilage as measured on a Brookfield viscometer, using ASTM E-2196, was 143,000 cps at pH 7, 1 RPM. When measured at 1 RPM and 0.5 RPM, the yield value of viscosity was 379.

EXAMPLE 2

The polymers of Example 2 were prepared according to the process of Example 1 with the exception that the initiator of Example 1 was replaced by the various initiators of Example 2.

Example 2 demonstrates the use of different chemical initiators: t-butyl peroctoate, Vazo 52, Vazo 64, redox dibenzoyl peroxide/Vazo 52, and dibenzoyl peroxide, in the process of the present invention. The copolymers produced showed significant differences in thickening efficiency. The abbreviations used in Tables I and II are identified as follows:

AMA—allyl methacrylate
ALA—allyl acrylate
DVB—divinyl benzene
BADM—bisphenol A dimethacrylate
EGDM—ethylene glycol dimethacrylate
DVG—divinyl glycol
TMPTMD—trimethylolpropane trimethacrylate
TVS—tetravinyl silane
t-BPO—t-butyl peroctoate
DBP—dibenzoyl peroxide
Vazo 52—2,2'-azobis(2,4-dimethylpentanenitrile)
Vazo 64—2,2'-(2-methylpropanenitrile)
APE—allyl pentaerythritol
TMPDAE—trimethylolpropane diallylether

TABLE I

| Monomer | Cross-linker | | Initiator | | Mucilage Viscosity (cps) |
|---|---|---|---|---|---|
| AA WT % | Type | Mole % | Type | Mole % | 0.5% |
| 10 | AMA | 0.07 | t-BPO | 0.05 | 101,000 |
| 10 | AMA | 0.07 | Vazo 52 | 0.02 | 51,000 |
| 10 | AMA | 0.07 | Vazo 64 | 0.03 | 48,000 |
| 10 | AMA | 0.07 | DBP/Vazo 52 | 0.015/0.015 | 244,000 |
| 10 | AMA | 0.07 | DBP | 0.045 | 100,300 |

EXAMPLE 3

Employing the procedure and the equipment of Example 1, a series of acrylic acid-allyl methacrylate copolymers was made in polydimethylcyclosiloxanes such as Dow Corning® 244, Dow Corning® 344, Dow Corning® 245, Dow Corning® 345 and linear polydimethylsiloxanes such as 200® fluids. Dow Corning® 244 (D4) is octamethylcyclotetrasiloxane, b.p. 172° C. Dow Corning® 245 (D5) is decamethylcyclopentasiloxane, b.p. 205° C. Dow Corning® 344 is a mixture of D4/D5 90/10%, b.p. 178° C. Dow Corning® 345 is a mixture of D5/D6, b.p. 217° C., wherein D6 is dodecamethylcyclohexasiloxane. All are in the category of cyclomethicones. The 200® fluids are linear polydimethylsiloxanes (also known as dimethicones). Only two of them are volatile: the 200® fluid 0.65 cs, which is hexamethyldisiloxane (b.p. 100° C.) having the formula $(CH_3)_3SiOSi(CH_3)_3$; and 200® fluid 1.0 cs, which is octamethyltrisiloxane b.p. 152° C., has the formula $(CH_3)_3SiO(CH_3)_2SiOSi(CH_3)_3$. Other 200® fluids are non volatile with boiling points over 192° C. and their typical chemical composition is $(CH_3)_3SiO[SiO(CH_3)_2]_xSi(CH_3)_3$ (where x=1 to 2,500,000). In each instance, a viscosity over 40,000 cps was obtained for a 0.5% mucilage neutralized to pH 7 and measured at 1 RPM using ASTM E-2196.

EXAMPLE 4

Example 1 was repeated except that concentration of acrylic acid in the solvent was changed from 10% by weight to 8% by weight. The resulting polymer provided a viscosity of 178,000 cps at 0.5% by weight mucilage as measured on a Brookfield Viscometer using ASTM E-2196 at 1 RPM.

EXAMPLE 5

A number of polymers were produced in accordance with the typical process as it has been described in Example 1, except that different cross-linkers were employed. The viscosities of their respective 0.5% by weight mucilages were measured on a Brookfield viscometer using ASTM E-2196 at 1 RPM. The results are reported in Table II.

TABLE II

| CROSS-LINKER | | MUCILAGE VISCOSITY (cps) |
|---|---|---|
| Type | Mole % | 0.5% |
| ALA | 0.07 | 27,500 |
| DVB | 0.07 | 2,000 |
| BADMA | 0.07 | 300 |
| EGDMA | 0.07 | 300 |
| DVG | 0.07 | 300 |
| AMA | 0.01 | 11,500 |
| AMA | 0.03 | 72,000 |
| AMA | 0.05 | 95,400 |
| AMA | 0.07 | 143,000 |
| AMA | 0.09 | 109,000 |
| AMA | 0.11 | 39,000 |
| TMPTMA | 0.07 | 4,900 |
| TVS | 0.07 | 17,200 |
| APE | 0.02 | 128,000 |
| TMPDAE | 0.05 | 127,000 |

EXAMPLE 6

This example is set forth for purposes of comparison. Following the procedure of Example 1, polymerization was run substituting ethyl acetate as the solvent in place of Dow Corning® 244. The copolymer that was produced in the ethyl acetate exhibited a viscosity of 103,000 cps viscosity at 0.5% by weight mucilage, whereas the copolymer of Example 1, that was identically produced but for being polymerized in a siloxane solvent, exhibited a viscosity of 143,000 cps (ASTM E-2196 at 1 RPM) at 0.5% by weight mucilage.

EXAMPLE 7

In a 2 liter glass reactor equipped with a stirrer, a thermometer and a reflux condenser, 263 grams of the Dow Corning® 244 silicone solvent were placed along with 0.15 grams of Vazo 52 initiator. The mixture was agitated at 60 RPM for half an hour and purged with argon for the same time. Separately, in an addition funnel, 47 grams of acrylic acid were purged with argon for 15–20 minutes. Purging of contents in the reactor and the addition funnel was ceased after elapse of the time. With the inert purge continuing at the top of the reactor, heating was commenced. When the reaction mixture reached 70° C., metering of acrylic acid was started at the rate of 0.281 gram/min. Polymerization was evident by formation of turbidity at 72° C. During polymerization, viscosity of the slurry was enhanced. In order to keep uniform mixing, revolution was adjusted to 100 RPM. Metering was finished at a constant rate at 3 hours. The slurry was recovered from the reaction flask and filtered to remove the remaining silicone solvent. The polymer was then dried in an oven at 80° C. The dry polymer was particulate and free flowing. Molecular weight of the polymer was 700,000. The polymer was easy to dissolve in water to a crystal clear solution.

EXAMPLE 8

The polymer of Example 8 was prepared according to the process of Example 7 with the exception that 3-mercaptopropionic acid at levels of 1–5 mole percent, based on acrylic acid, as a chain transfer agent, was employed in the synthesis. The data are set forth in Table III.

TABLE III

| Chain Transfer Agent | Mole % of AAA | Weight Average Molecular Weight, Mw |
|---|---|---|
| 3-MPA* | 1 | 27,000 |
| 3-MPA | 2 | 21,000 |
| 3-MPA | 3 | 7,000 |
| 3-MPA | 4 | 5,000 |
| 3-MPA | 5 | 4,000 |

*3-MPA = 3-mercaptopropionic acid

EXAMPLE 9

Polymerization was conducted in a 2 liter round bottom three neck flask, equipped with stirrer, thermometer, condenser and nitrogen purge. The silicone solvent Dow Corning® 244 (263 gs) was initially charged into the reactor flask and purged with oxygen free nitrogen. The appropriate amounts of comonomer (see Table IV) and 0.04 grams allylmethacrylate cross-linker were dissolved in 36 grams of acrylic acid, which was then pre-neutralized with 0.518 grams of potassium carbonate, while a nitrogen purge was employed. The monomer mixture was subsequently added to the reaction flask containing the silicone fluid and stirring was continued until the reaction mixture became clear. A nitrogen purge was maintained throughout the mixing procedure. To the reaction mixture 0.086 grams of 6-butyl percolate initiator were added and agitation discontinued prior to commencement of heating. Initial spots of polymer were visible at the bottom of the reactor from a ca 50° C. The mixture turned cloudy from ca 78° C. and a white precipitate was formed from 80° C. In order to prevent the exotherm, cooling was employed from 90° C. After cessation of the exotherm, the temperature of the reaction flask was maintained at 70° C. for 6 hours. The polymer recovered from the flask was filtered, to remove remaining silicone fluid and then dried in an oven at 100° C. for three hours.

TABLE IV

| | Comonomer wt % on | Viscosity (cps) as measured by Brookfield RVT viscometer 1 wt % pH 7, 1 RPM | |
|---|---|---|---|
| Comonomer | acrylic acid | Water | 1% saline |
| 0 | 0 | 123,000 | 5,800 |
| LM | 3.5 | 128,000 | 6,000 |
| SM | 3.5 | 148,000 | 5,200 |
| LM | 6.7 | 224,000 | 5,800 |
| Sm | 6.7 | 192,000 | 2,000 |

LM: Lauryl methacrylate
SM: Stearyl methacrylate

EXAMPLE 10

The procedures for preparation of hydrophobically modified polyacrylic acid as described in Example 9 was repeated, except that no cross-linker was used. The data are set forth in Table V.

TABLE V

| Comonomer | Comonomer wt % on acrylic acid | Viscosity (cps) as measured by Brookfield RVT viscometer 1 wt % pH 7, 1 PRM | |
|---|---|---|---|
| | | H$_2$O | 1% saline |
| 0 | 0 | 160 | soluble |
| LM | 2.8 | 29,600 | 36,400 |
| SM | 2.8 | 17,600 | 46,400 |
| LM | 5.6 | 24,000 | 30,000 |
| SM | 5.6 | 202,000 | 10,800 |
| LM | 8.3 | 42,000 | 22,400 |
| SM | 8.3 | 252,000 | 500 |
| LM | 11.1 | 110,000 | 12,000 |
| SM | 11.1 | 314,000 | 600 |

LM: Lauryl methacrylate
SM: Stearyl methacrylate
Viscosities were typically measured at 1 wt % concentration using Brookfield LVT viscometer and a spindle speed 1.5 RPM. Salt sensitivity was determined at 1 wt % saline, the NaCl being added in solid form to neutralized microgel, while stirring. After the salt addition, samples were left to equilibrate for at least 2 hours before the viscosity was measured. From patent literature, this would appear to be the standard procedure for examining salt tolerance.

What is claimed is:

1. A water-viscosifying copolymer, capable of viscosifying water when added thereto in an effective amount, comprising a cross-linked copolymer of a carboxylic acid monomer and a polyfunctional cross-linker monomer having at least two unsaturated carbon-carbon double bonds, wherein said carboxylic acid monomer and said polyfunctional cross-linker monomer are present at a mole ratio of 1:0.03 to 1:0.1, respectively, polymerized in a silicone solvent, in the presence of an effective amount of an initiator to form said water-viscosifying copolymer.

2. The copolymer of claim 1, wherein a 0.5% by weight aqueous solution of said viscosifying copolymer has a viscosity of about 50,000 to 300,000 cps at 1 RPM.

3. The method of claim 1, wherein the initiator is a peroxide initiator selected from the group consisting of t-butylperoctoate, dibenzoylperoxide, and lauroyl peroxide.

4. The method of claim 1, wherein the silicone solvent is a member selected from the group consisting of a cyclomethicone, a linear polydimethylsiloxane, a polymethylalkyl siloxane and a polyfluoroalkyl methyl siloxane.

5. The method of claim 4, wherein the silicone solvent is a cyclomethicone.

6. The method of claim 5, wherein the cyclomethicone is a member selected from the group consisting of octamethylcyclotetrasiloxane, decamethylcyclopentasiloxane, dodecamethylcyclohexasiloxane and mixtures thereof.

7. The method of claim 6, wherein the silicone solvent is a linear polydimethylsiloxane.

8. The method of claim 7, wherein the linear polydimethylsiloxane is a member selected from the group consisting of hexamethyl disiloxane, octamethyl trisiloxane, decamethyl tetrasiloxane, dodecamethyl pentasiloxane, and mixtures thereof.

* * * * *